(12) United States Patent
Kim et al.

(10) Patent No.: US 7,668,049 B2
(45) Date of Patent: Feb. 23, 2010

(54) OPTICAL PICKUP ACTUATOR AND OPTICAL RECORDING/REPRODUCING APPARATUS

(75) Inventors: Seok-jung Kim, Suwon-si (KR); Jung-gug Pae, Suwon-si (KR); Hyung-hoon Kang, Seould (KR); Young-man Ahn, Suwon-si (KR); Tae-youn Heor, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 632 days.

(21) Appl. No.: 11/311,350

(22) Filed: Dec. 20, 2005

(65) Prior Publication Data

US 2006/0136953 A1    Jun. 22, 2006

(30) Foreign Application Priority Data

Dec. 22, 2004    (KR) ...................... 10-2004-0110311

(51) Int. Cl.
*G11B 7/00* (2006.01)
(52) U.S. Cl. .................................................. 369/44.15
(58) Field of Classification Search .............. 369/44.15, 369/44.16, 44.14, 44.22, 44.32
See application file for complete search history.

(56) References Cited

U.S. PATENT DOCUMENTS

| 5,673,247 | A | * | 9/1997 | Sekimoto et al. ....... 369/112.17 |
| 6,724,696 | B2 | * | 4/2004 | Kim et al. ................ 369/44.16 |
| 6,895,593 | B2 | * | 5/2005 | Kim et al. .................... 720/669 |
| 7,054,078 | B2 | * | 5/2006 | Fujita ....................... 369/44.22 |
| 7,168,082 | B2 | * | 1/2007 | Takeshita et al. ......... 369/44.15 |
| 7,194,749 | B2 | * | 3/2007 | Hatazawa ................... 720/683 |
| 2004/0240335 | A1 | | 12/2004 | Cho et al. |

FOREIGN PATENT DOCUMENTS

| EP | 0874358 | 10/1998 |
| EP | 1094453 | 4/2001 |
| EP | 1316949 | 6/2003 |
| EP | 1394783 | 3/2004 |
| JP | 04205821 | 7/1992 |
| JP | 09-171630 | 6/1997 |
| JP | 2003-141760 | 5/2003 |
| JP | 2003-173556 | 6/2003 |
| JP | 2003-263759 | 9/2003 |
| KR | 2004-0018135 | 3/2004 |
| KR | 2004-75474 | 8/2004 |

* cited by examiner

*Primary Examiner*—Thang V Tran
(74) *Attorney, Agent, or Firm*—Roylance, Abrams, Berdo & Goodman, L.L.P.

(57) ABSTRACT

An optical pickup actuator is provided. The actuator comprises a bobbin, on which one or more objective lenses are mounted for allowing light to be incident onto an optical information storage medium, and which is supported by a support member to be movable in relation to a base. The actuator also comprises a magnetic circuit for independently driving the bobbin in focusing and tilt directions.

29 Claims, 7 Drawing Sheets

OPTICAL PICKUP ACTUATOR AND OPTICAL RECORDING/REPRODUCING APPARATUS

CROSS-REFERENCE TO RELATED APPLICATIONS

This application claims the benefit under 35 U.S.C. §119(a) of Korean Patent Application No. 2004-110311 filed Dec. 22, 2004, the entire contents of which are hereby incorporated by reference.

BACKGROUND OF THE INVENTION

1. Field of the Invention

The present invention relates to an optical pickup actuator and an optical recording/reproducing apparatus. In particular, the present invention relates to an optical pickup actuator for driving an objective lens mounted on the actuator in such a way that information can be recorded into, and reproduced from, an optical information storage medium, and an optical recording/reproducing apparatus having the same.

2. Description of the Related Art

Conventionally, a Digital Versatile Disk (DVD) is recorded/reproduced using an objective lens having a numerical aperture of 0.6 (in a recordable type, 0.65) and a light having a wavelength of 650 nm (or 635 nm). If such a DVD has a diameter of 120 mm and a track pitch of 0.75 μm, the DVD has a recording capacity of not less than 4.7 GB on one side thereof.

Therefore, such a DVD is not sufficient as a recording medium for recording moving image information of an HD (High Definition) grade, because a recording capacity of, for example, not less than 23 GB on one side of a DVD is required to record 135 minutes of moving image information in the HD grade.

In order to meet such a requirement for high-density record capacity, development and standardization for High Definition-DVD (HD-DVD), that is, next generation DVD are proceeding. The developments include using a light having a shorter wavelength than red color (that is, a blue light), employing an objective lens having a numerical aperture larger than 0.6, and having a narrower track.

In order to maintain a tolerance due to a tilt of an optical disc, the thickness of the optical disc may be reduced as the numerical aperture of an objective lens is increased for obtaining a high density. In consideration of an allowed tolerance due to a tilt of an optical disc, the thickness has been reduced from 1.2 mm for Compact Discs (CD's) to 0.6 mm for DVD's. For HD-DVD's, it is highly feasible for the thickness to be 0.1 mm. The numerical aperture of an objective lens has been increased from 0.45 (for CD's) to 0.6 (for DVD's). For HD-DVD's, it is highly feasible for the numerical aperture to be 0.85. In addition, it is highly feasible for a celadon light source to be employed as a light source for HD-DVD's in consideration of a record capacity. A problem encountered in developing optical discs of a new standard as described above is compatibility with existing optical discs.

However, a fairly sophisticated technique is required in developing and fabricating a one-piece objective lens having a high numerical aperture, for example 0.85. Furthermore, it is difficult to lengthen a working distance of such an objective lens to a distance suitable for an objective lens for a DVD, while allowing the objective lens to have such a high numerical aperture.

Therefore, it is required for a compatible type optical pickup capable of high-density recording/reproduction to separately include at least one objective lens for use in recording/reproducing a CD and/or a DVD and an objective lens for use in high-density recording, wherein the objective lens for use in high-density recording has a higher numerical aperture than the objective lens for use in recording a CD and/or a DVD, so as to address the problem of having proper working distance.

Meanwhile, since an actuator for such an optical pickup has a magnetic circuit configured in such a way that the actuator can be driven in both focus and track directions, the actuator serves to maintain the distance between an optical disc and an objective lens constant and to move the objective lens to a desired position (center of the track) in the track direction.

In order to address optical pickup compatibly when employing plural optical discs of different recording density, as described above, it is necessary to provide plural objective lenses each corresponding to one of plural optical discs of different recording capacity. Accordingly, an actuator applied to an optical pickup having plural objective lenses requires a magnetic circuit that can drive at least one of the plural objective lenses mounted on a movable part in focus, track and tilt directions while maintaining high sensitivity. Thus, complexity of construction is increased to meet the demands of HD-DVD.

SUMMARY OF THE INVENTION

Accordingly, the present invention has been made to address the above-mentioned problems, and an object of the present invention is to provide an optical pickup actuator improved to maintain high sensitivity with a simple construction and an optical recording/reproducing apparatus having the same.

According to an embodiment of the present invention, there is provided an optical pickup actuator comprising a bobbin, on which one or more objective lenses are mounted for allowing light to be incident into an optical information storage medium, and which is supported by a support member to be movable in relation to a base, and a magnetic circuit for driving the bobbin independently in focusing and tilt directions.

According to an embodiment of the present invention, the magnetic circuit comprises a pair of focusing coils installed to be adjacent to each other in the bobbin, a tilt coil having working sides corresponding to working sides of the focusing coils, respectively, and one or more magnet sections for generating a driving force in the focusing direction by cooperating with the focusing coils, and a driving force in the tilt direction by cooperating with the tilt coil.

According to an embodiment of the present invention, the magnet sections comprise a first magnet section, in which the bobbin is interposed, and a second magnet section arranged to be adjacent to the first magnet section, so that the second magnet section is opposite in polarity to the first magnet section diametrically across the bobbin interposed between the first and second magnet sections.

According to an embodiment of the present invention, each of the first and second magnet sections comprises a pair of polarization magnets arranged to confront each other with the bobbin being interposed between them, wherein the polarization magnets are depolarized in the direction parallel to the working sides of the focusing coils.

According to an embodiment of the present invention, the focusing coils are arranged parallel to the track direction, which crosses the focusing direction.

According to an embodiment of the present invention, the focusing coils and the tilt coil are arranged to be overlapped with each other in the focusing direction.

According to an embodiment of the present invention, the focusing coils are positioned higher than the tilt coil in reference to the focusing direction.

According to an embodiment of the present invention, the focusing coils are formed to have a larger thickness than that of the tilt coil in the focusing direction.

According to an embodiment of the present invention, the magnetic circuit further comprises one or more internal yokes installed inside of the focusing coils and the tilt coil, and one or more external yokes installed outside of the focusing coils and tilt coil.

According to an embodiment of the present invention, the external yokes are provided on the base to support the magnet sections.

According to an embodiment of the present invention, the internal yokes may comprise a pair of first internal yokes arranged to confront the sides of the focusing coils and the tilt coil, which are parallel to the track direction of the optical information storage medium, and a pair of second internal yokes adjacent to the first internal yokes in the track direction and arranged to confront the working sides of the focusing coils and the tilt coil.

According to an embodiment of the present invention, the bobbin is provided with plural lens mounting holes arranged in the track direction of the optical information storage medium so that plural objective lenses can be mounted on the bobbin.

According to an embodiment of the present invention, the bobbin is formed with a pair of lens mounting holes, and the magnetic circuit comprises a pair of focusing coils wounded about the lens mounting holes, respectively, a tilt coil RF wounded to surround both lens mounting holes, and one or more magnet sections for generating a driving force in the focusing direction by cooperating with the focusing coils, and a driving force in the tilt direction by cooperating with the tilt coil.

According to an embodiment of the present invention, the bobbin may comprise a coil mounting area communicating with the lens mounting holes and the coil mounting area receives the focusing coils and the tilt coil to be adjacent to each other in the track direction.

According to an embodiment of the present invention, the focusing coils and the tilt coil are arranged to be adjacent to each other in the focusing direction.

According to an embodiment of the present invention, the bobbin has a coil mounting area for supporting the focusing coils and the tilt coil on the inner walls thereof, and that the coil mounting area comprises a partition interposed between the focusing coils to isolate them.

According to an embodiment of the present invention, the magnetic circuit may further comprise a pair of track coils for driving the bobbin in the track direction of the optical information storage medium by cooperating with the magnet sections.

According to an embodiment of the present invention, the track coils may be supported on the external surfaces of the bobbin respectively confronting the magnet sections, wherein the track coils are installed between the focusing coils in the track direction.

According to an embodiment of the present invention, the track coils may be arranged in such a way that the sides parallel to the focusing direction among the sides confronting the magnet sections are able to take part in generation of an electromagnetic force in the track direction.

According to another aspect of the present invention, there is also provided an optical pickup actuator comprising a bobbin, on which plural objective lenses can be mounted for recording information into, and/or reproducing information from, optical information record mediums which are different from each other in recording density, a support member for supporting the bobbin to be movable in relation to a base, and a magnetic circuit capable of driving the bobbin independently in a focus direction and a tilt direction.

According to an embodiment of the present invention, the magnetic circuit comprises plural focusing coils supported in the bobbin to correspond to the plural objective lenses, respectively, a tilt coil installed in the bobbin to correspond all the objective lenses, and a pair of polarization magnets arranged to confront each other with the bobbin being interposed between the polarization magnets, in which the polarization magnets are bipolarized in the track direction of the optical information record mediums.

According to another aspect of the present invention, there is also provided an optical recording/reproducing apparatus comprising an optical pickup having an actuator for driving an objective lens and installed to be movable in the radial direction of an optical information storage medium to record information into, and/or reproduce information from, the optical information storage medium, and a controller for controlling focusing, track and tilt servos, wherein the actuator comprises a bobbin, on which one or more objective lenses are mounted for allowing light to be incident into an optical information storage medium, and which is supported by a support member to be movable in relation to a base, and a magnetic circuit for driving the bobbin independently in focusing and tilt directions.

BRIEF DESCRIPTION OF THE DRAWINGS

The above aspects and features of the present invention will be more apparent from the description for certain exemplary embodiments of the present invention taken with reference to the accompanying drawings, in which the same or similar elements, features and structures are represented by the same reference numerals, wherein.

DETAILED DESCRIPTION OF EXEMPLARY EMBODIMENTS

Herein below, optical pickup actuators according to exemplary embodiments of the present invention are described in detail with reference to accompanying drawings.

Figure 1:
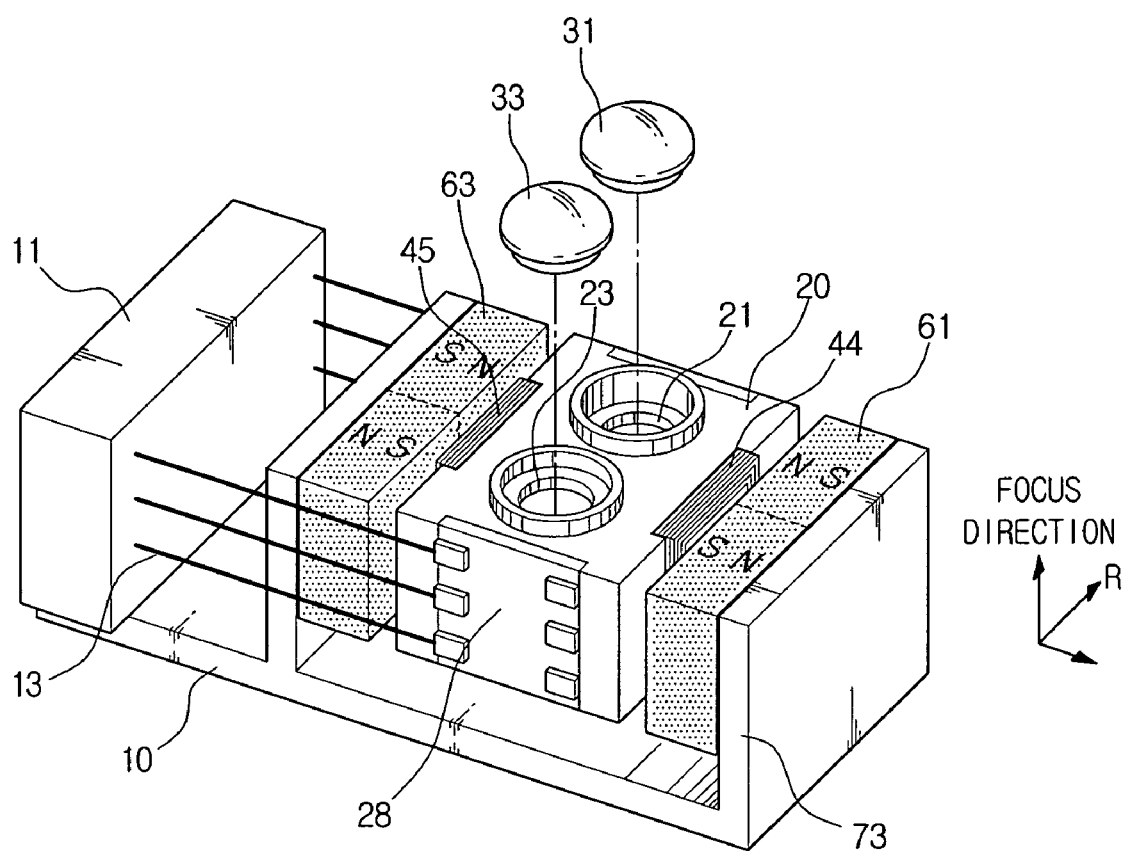
FIG. 1 is a schematic exploded perspective view showing an optical pickup actuator according to an embodiment of the present invention.

Referring to FIG. 1, an optical pickup actuator according to an embodiment of the present invention comprises a holder 11 supported on a base 10, a bobbin 20 having plural lens mounting holes 21, 23 each retaining corresponding one of plural objective lenses 31, 33, in which the plural objective lenses 31, 33 may have working distances different from each other, one or more supporting members (for example, suspensions) 13, and a magnetic circuit for driving the bobbin 20 independently in a focus direction, a tilt direction and a track direction.

The plural objective lenses 31, 33 comprise a first objective lens 31 for use in recording information into, and/or reproducing information from, one or more low-density optical discs different in recording density, and a second objective lens 33 for use in recording information into, and/or reproducing information from, an optical disc which has a higher recording density than the low-density optical discs (herein below, the optical disc which has a higher recording density is referred to as "high-density optical disc"). The first objective lens 31 may be provided in such a way that it can additionally record information into, and/or reproduce information from, a CD series optical disc (herein below, "CD") while being capable of recording information into, and/or reproducing information from, for example, a DVD series optical disc (herein below, "DVD"). The second objective lens 33 may be provided in such a way that it can record information into, and/or reproduce information from, for example, a HD-DVD series optical disc (herein below, "HD-DVD"), which has a higher density than a DVD. Here, the objective lenses 31, 33 may comprise three or more objective lenses so that they can be used in recording information into, and/or reproducing information from, three or more kinds of optical discs which are different in recording density from each other.

According to an exemplary implementation of the present invention, an actuator is arranged in such a way that plural objective lenses 31, 33 can be mounted on one bobbin 20 in the radial direction (R direction) of an optical disc, so as to secure compatibility with an optical pickup that requires plural objective lenses.

If the bobbin 20 has a construction for mounting two objective lenses 31, 33 as described above, then in an exemplary implementation, the bobbin 20 can have a first lens mounting hole 21 for receiving a first objective lens 31, and a second lens mounting hole 23 for receiving a second objective lens 33. Here, the number of lens mounting holes corresponds to the number of objective lenses to be mounted on the bobbin 20.

Figure 4:
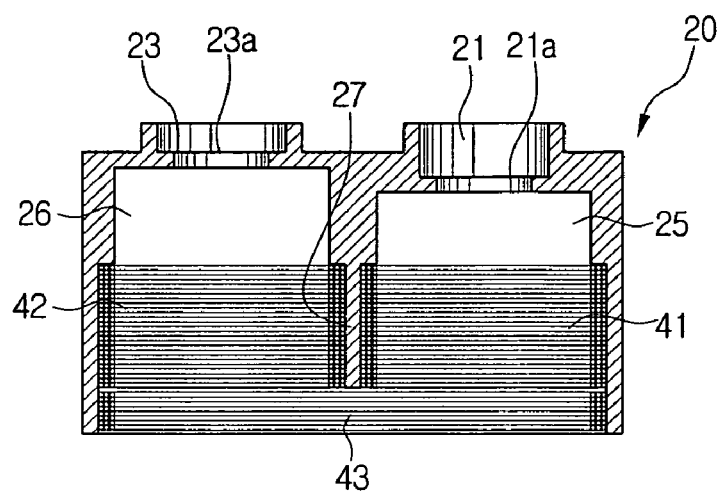
FIG. 4 is a cross-sectional view of the bobbin extracted from FIG. 1.

The first and second lens mounting holes 21, 22 are arranged in the R direction. In addition, the lens holes 21, 23 are formed, for example, in such a way that the objective lenses 31, 33 can be positioned at different heights from each other, as shown in FIG. 4. That is, the first lens mounting hole 21 may be formed with a seating ridge 21a at a depth relatively deep from the top surface of the bobbin 20 confronting an optical disc, so that the first objective lens 31 having a longer working distance can be mounted for use in a low-density optical disc. The second lens mounting hole 23 may be formed with a seating ridge 23a at the level of the top surface of the bobbin 20 confronting an optical disc (or at a position more close to the top surface of the bobbin 20 than the seating ridge 21a formed in the first lens mounting hole 21), so that a second objective lens 33 having a short working distance can be mounted for use in a high-density optical disc.

According to an exemplary implementation of the present invention, the top surface of the bobbin 20 is open through the lens mounting holes 21, 23 and the lower part of the bobbin 20 has a substantially hexahedron shape, which is opened through the coil mounting areas 25, 26. The coil mounting areas 25, 26 are divided in the R direction by a central partition 27. The coil mounting areas 25, 26 are provided with focusing coils 41, 42 and a tilt coil to be described later within the inner sides thereof.

The bobbin 20 is movably supported on a holder 11 by the support members 13. The support members 13 may be spring wires with a predetermined rigidity, which are elastically deformable. On each of the front and rear sides of the bobbin 20, there may be provided a connection board 28, to which the support members 13 are affixed through soldering or the like. Therefore, it is possible to deliver electric currents to the magnetic circuit through the support members 13. The bobbin 20 configured as described above may be formed from a plastic material through a injection molding process.

Figure 2:
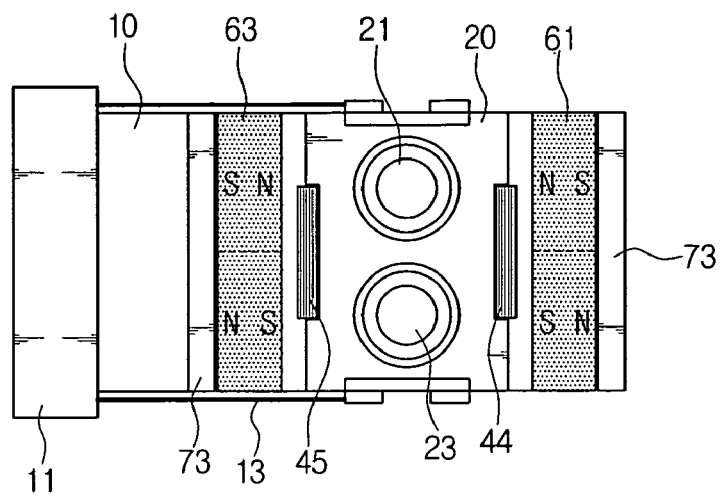
FIG. 2 is a top plan view of the optical pickup actuator shown in FIG. 1.
Figure 3:
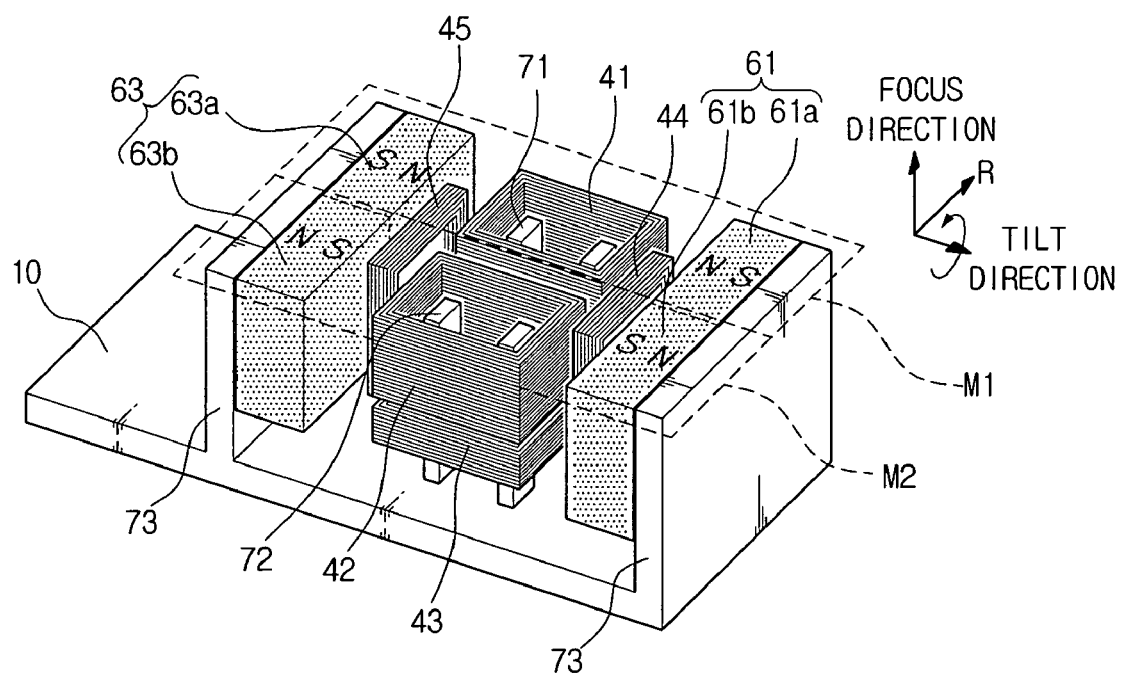
FIG. 3 is a perspective view showing a magnetic circuit according to an exemplary embodiment of the present invention, in which a bobbin is removed from the state shown in FIG. 1.

The magnetic circuit serves to drive the objective lenses 31, 33 independently in the focus direction, in track direction (herein below, referred to as "R direction"), and in the tilt direction. The magnetic circuit comprises a pair of focusing coils 41, 42, a tilt coil 43, a pair of track coils 44, 45, and first and second polarization magnets 61, 63, as shown in FIGS. 2 to 4.

The focusing coils 41, 42 are located adjacent to each other in the R direction. That is, as shown in FIG. 4, they are installed to be in close contact with the inner walls of the coil mounting areas 25, 26 with the partition 27 being interposed between the focusing coils 41, 42. Each of the focusing coils 41, 42 is wound substantially in a rectangular shape to have an air core in the focus direction and to be laminated to a predetermined height in the focus direction. In addition, the focusing coils 41, 43 are arranged to be wounded about the first and second objective lenses 31, 33, respectively.

The focusing coils 41, 44 will be concurrently forced to drive the bobbin 20 in the focus direction by the cooperation of the sides thereof, which are parallel to each other in the R direction, with the first and second polarization magnets 61, 63. These focusing coils 41, 42 are arranged in such a way that electric currents are applied to the focusing coils 61, 63 in the opposite directions, whereby the focusing coils will be forced in the same direction if the electric currents are applied to the focusing coils 41, 42.

The tilt coil 43 is arranged to be overlapped with the focusing coils 41, 42 in the focus direction. That is, one tilt coil 43 is wound substantially in a rectangular shape and installed to be in close contact with the inner walls of the coil mounting areas 25, 26 of the bobbin 20. The tilt coil 43 is provide at a position lower than the focusing coils 41, 42 and formed in a thickness smaller than those of the focusing coils 41, 42 in the focus direction. Therefore, the forces acting in the focus direction will be generated mainly in the focusing coils 41, 42. In addition, the tilt coil 43 will generate forces opposite to each other with reference to the central position of the bobbin 30 in the R direction, thereby allowing the bobbin 20 to move in the tilt direction.

According to an exemplary implementation of the present invention, since the tilt coil 43 is arranged over the coil mounting areas 25, 26, the partition 27 is spaced from the bottom end of the bobbin 20 by a predetermined height, so that a mounting space for the tilt coil 43 can be provided.

The tilt coil 43 receives electric current in a same direction with one of the focusing coil, so that the tilt coil will be forced in the tilt direction. That is, the tilt coil 43 drives the bobbin 20 while being driven independently from the focusing coils 41, 42.

The track coils 44, 45 are respectively mounted on the external sides of the bobbin 20, which are parallel to the R direction. The track coils 44, 45 respectively extend over the interspace between the focusing coils 41, 42 in the R direction. If the track coils 44, 45 respectively extend over the interspace between the focusing coils 41, 42 in this manner, the operation sides of the track coils 44, 45 will be arranged to each face one of the polarized N-pole parts and S-pole parts of the polarization magnet 61, 63, respectively. Each of the track coils 44, 45 is wound in a rectangular shape, so that the sides of the track coils 44, 45 parallel to the focus direction face the N-pole parts 61$a$, 63$a$ and S-pole parts 61$b$, 63$b$ of the polarization magnets 61, 63, respectively. These track coils 51, 53 will receive forces for driving the bobbin 20 in the track direction through the cooperation with the polarization magnets 61, 63.

The polarization magnets 61, 63 are spaced from each other and parallel to the R direction of the bobbin 20 with the bobbin 20 being interposed between the polarization magnets 61, 63. Each polarization magnet 16; 63 has a first part 61$a$; 63$b$ and a second part 61$b$; 63$a$. These polarization magnets 61, 63 are arranged in such a way that both of them participate in driving the bobbin 20 in the focus direction, in the tilt direction and in the track direction and they are commonly used. For this purpose, the polarization magnets 61, 63 are arranged in such a way that the corresponding parts of the polarization magnets 61, 63, i.e., the parts confronting each other are same in polarity. In other words, the polarization magnets 61, 65 are arranged in such a way that they are opposite in polarity to each other diametrically across the bobbin 20.

According to an exemplary implementation of the present invention, the first part 61$a$ of the first polarization magnet 61 and the first part 63$a$ of the second polarization magnet 63 are arranged to be correspond to each other with the focusing coil 41 being interposed between them. In addition, the first parts 61$a$, 63$a$ are arranged in such a way that same poles thereof are facing to each other, thereby causing magnetic flux lines to extend in the opposite directions. In the present embodiment, the first parts 61$a$, 61$b$ are positioned so that N-poles thereof are facing to each other.

According to an exemplary implementation of the present invention, the second part 61$b$ of the first polarization magnet 61 and the second part 63$b$ of the focusing coil 42 are arranged to confront each other with the focusing coil 42 being interposed between them. The second parts 61$b$, 63$b$ are positioned so that S-poles thereof are facing to each other.

For the convenience of description, herein below, the first parts 61$a$, 63$b$ of the polarization magnets 61, 63, which are facing to each other, are referred to as first magnet section M1 and the second parts 61$b$, 63$b$ are referred to as second magnet section M2. The first and second magnet sections M1, M2 generate an electromagnetic force by cooperating with the focusing coils 41, 42 to drive the bobbin 20 in the focus direction.

In addition, the first and second magnet sections M1, M2 generate an electromagnetic force by cooperating with the tilt coil 43 to drive the bobbin 20 in the tilt direction. The first and second magnet sections M1, M2 generate an electromagnetic force by cooperating with the track coils to drive the bobbin 20 in the track direction. These driving actions will be described later.

The magnetic circuit further comprises first and second internal yokes 71, 72 located inside of the focusing coils 41, 42, and external yokes located to confront the polarization magnets 61, 63.

A pair of the first internal yokes 71 are arranged inside of the focusing coil 41. The first internal yokes 71 are positioned to confront the effective coil parts of the focusing coil 41 and the tilt coil 43, which confront the first magnet section M1, i.e., the parts parallel to the R direction. The first internal yokes 71 may be either affixed to the base 10 or integrally formed with the base 10 in a same metallic material. The first internal yokes 71 guide magnetic force lines generated in the focus and tilt directions from the focusing coil 41 and the tilt coil 43 in a state in which the focusing coil 41 and the tilt coil 43 are not in contact with each other, thereby maximizing the intensity of the effective magnetic field.

The second internal yokes 72 are located within another focusing coil 42 adjacent to the first internal yokes in the R direction. The construction and action of the second internal yoke 72 are same with those of the first internal yoke 71, and thus detailed description thereof is omitted.

The external yokes 73 may be either affixed to or integrally formed with the base 10. These external yokes 73 are positioned to confront the surfaces of the polarization magnets 61, 63 each facing away from the bobbin 20. It is advantageous that the external yokes 73 support the polarization magnets 61, 63. These external yokes 73 guide the electromagnetic force lines of magnetic field generated by the polarization magnets 61, 63 to be focused toward the bobbin 20, thereby maximizing the intensity of the effective magnetic field.

Now, the functional effect of the optical pickup actuator according to the above-described exemplary embodiment of the present invention is described in detail.

At first, the direction of a driving force generated by the cooperation of the second focusing coils 41, 43 and the first and second magnetic sections M1, M2 is described.

Figure 5A:
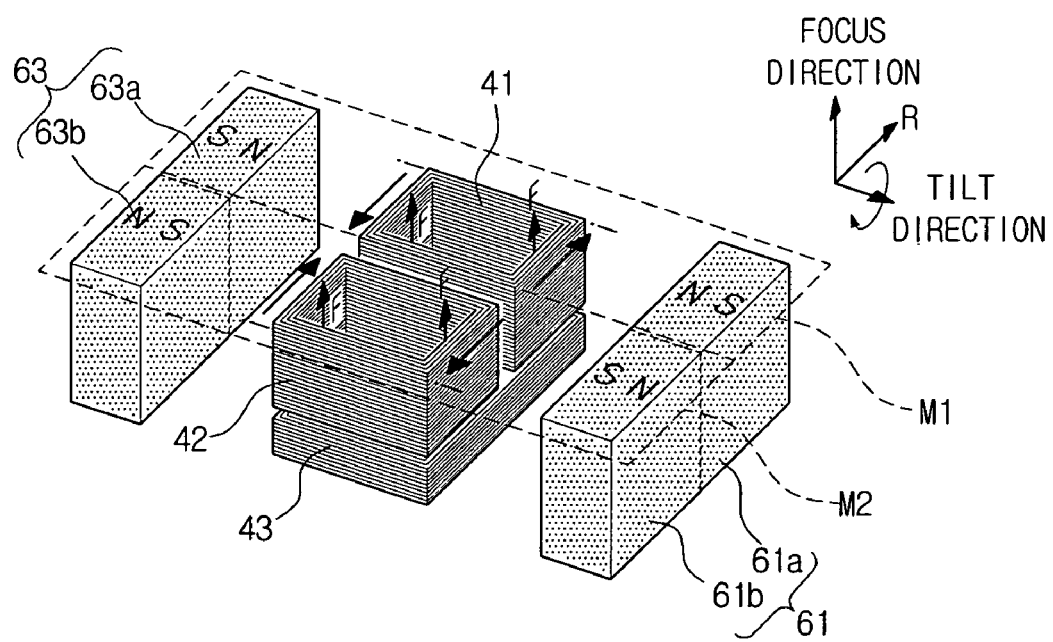
FIGS. 5A and 5B illustrate an operation for driving the bobbin in a focus direction according to an exemplary embodiment of the present invention.

As shown in FIG. 5A, the focusing coils 41, 42 are arranged to confront each other with the focusing coils 41, 42 being interposed between them. One focusing coil 41 is driven by cooperating with the first magnet section M1 and the other focusing coil 42 is driven by cooperating with the second magnet section M2. As shown in the drawing, electric currents are applied to the focusing coils 41, 42 in the opposite directions. Since the faces of the first parts 61$a$, 63$a$ confronting each other in the first magnet section M1 has N-pole, the magnetic fields produced thereby project in the opposite directions. Since electric currents are applied counterclockwise to the focusing coil 41, the sides of the focusing coil 41 parallel to the R direction are forced upward according to the Fleming's left hand rule. In addition, since the second parts 61$b$, 63$b$ forming the second magnetic section M2 are arranged so that the S-poles thereof confront one another, the magnetic fields generated in the second parts 61$b$, 63$b$ are projected in the directions remote from each other, as shown in the drawing. Accordingly, since the electric currents are applied clockwise to the focusing coil 42, the sides of the focusing coil 42 parallel to the R direction are forced upwardly. Consequently, as shown in FIG. 5A, if electric currents are applied to the pair of the focusing coils 41, 42 in the opposite directions, the movable unit comprising the bobbin 20, the first and the second objective lenses 31, 33, the focusing coils 41, 42, the tilt coil 43 and the track coils 44, 45 are moved upwardly.

Figure 5B:
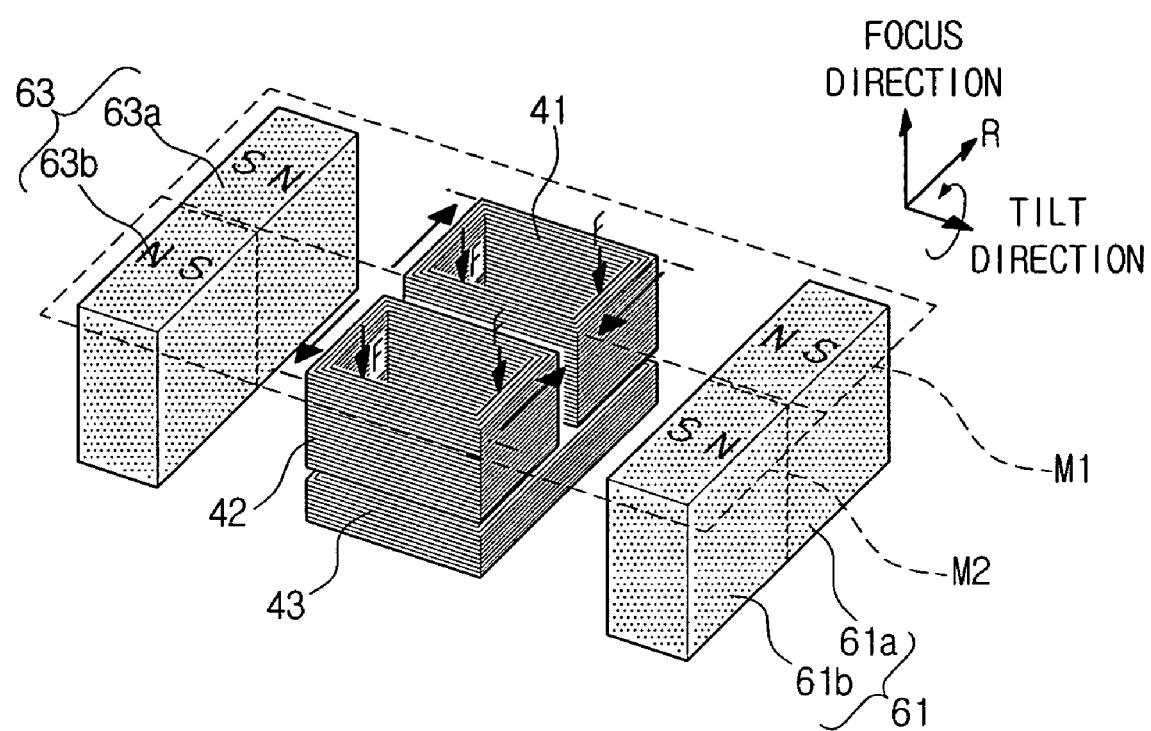

Referring to FIG. 5B, electric currents are applied to the focusing coils 41, 42 in the reversed sense in relation to the situation shown in FIG. 5A. In this event, the sides of the respective focusing coils 41, 42 parallel to the R direction are forced downwardly. Like this, if the polarity and amount of electric currents applied to each of the focusing coils 41, 42 are adjusted, the focus directions of the first and second objective lenses 31, 33 mounted on the bobbin 20 can be controlled to different positions.

Figure 6A:
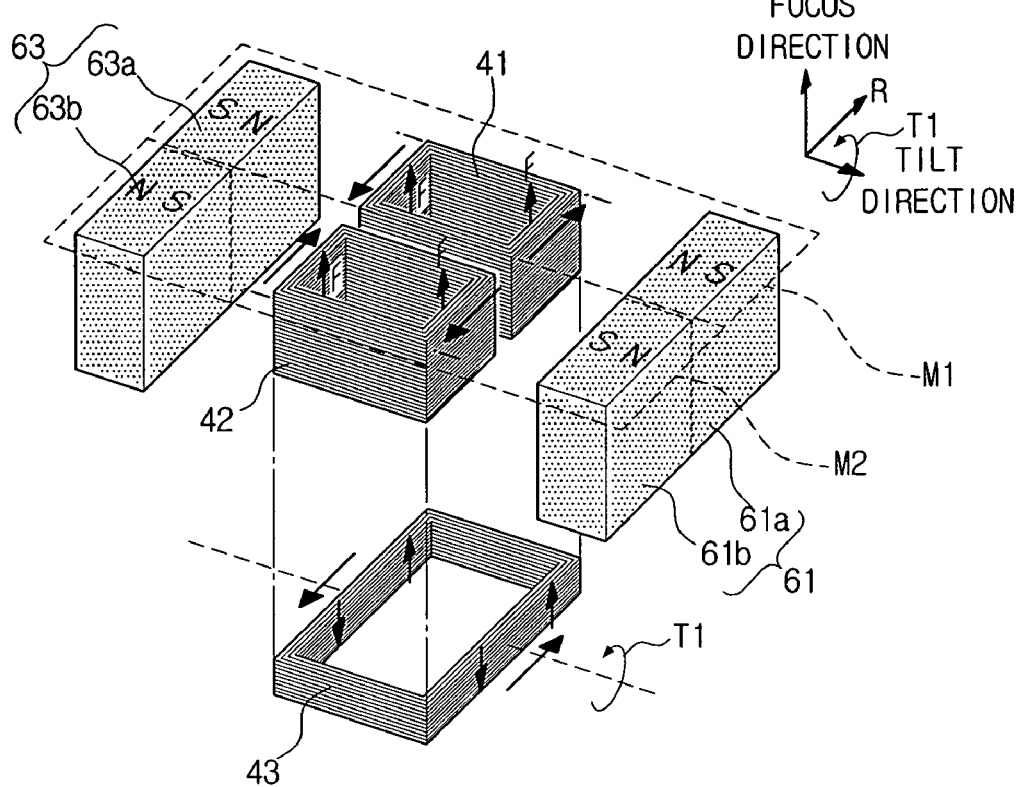
FIGS. 6A and 6B illustrate operations for driving the bobbin in a focus direction and a tilt direction, respectively, according to an exemplary embodiment of the present invention.

Referring to FIG. 6A, it is possible to upwardly drive the bobbin 20 by applying electric currents to the respective focusing coils 41, 42 as shown in FIG. 5A. Simultaneously with this, electric currents are applied counterclockwise to the tilt coil 43. Then, the tilt coil 43 is forced upwardly in the area corresponding to the first magnet section M2 and forced downwardly in the area corresponding to the second magnet section M2. Accordingly, it is possible to tilt the bobbin 20 to either side independently of the focusing coils 41, 42. That is, in the situation shown in FIG. 6, the bobbin 20 can be tiltingly driven by the tilt coil 43 by a predetermined angle in the T1 direction, concurrently with being moved upwardly by the focusing coils 41, 42.

Figure 6B:
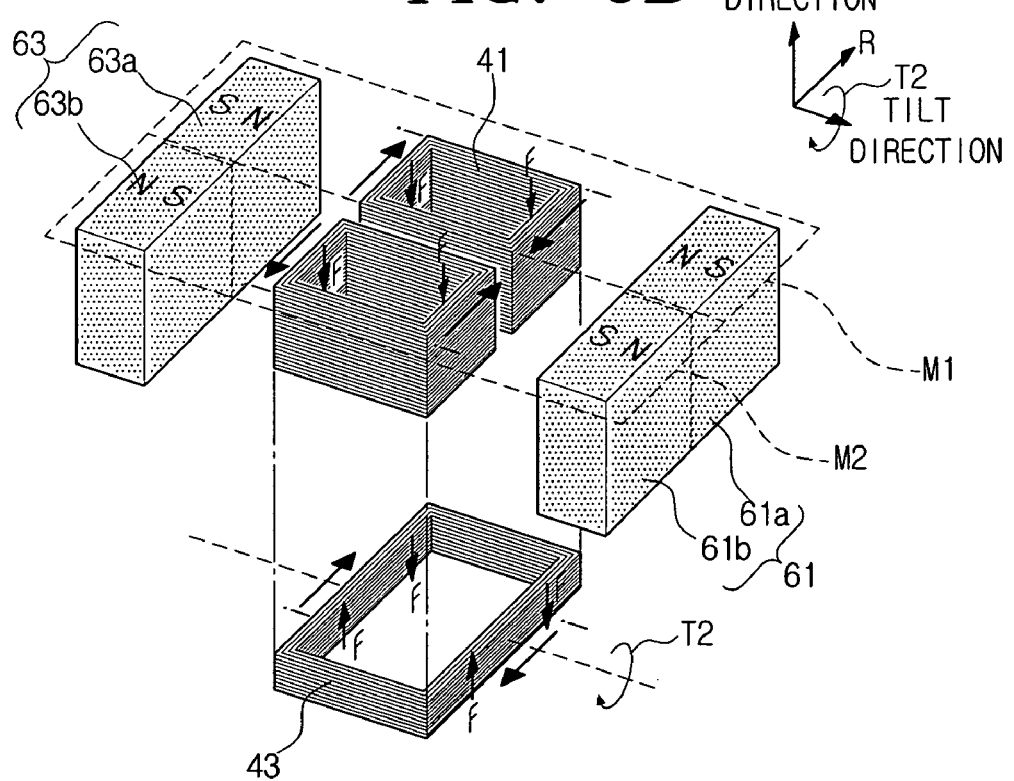

In contrast, as shown in FIG. 6B, by applying electric currents to the focusing coils 41, 42 in a same direction as described with reference to FIG. 5, it is possible to focus the bobbin 20 downwardly. Under this condition, electric currents are applied clockwise to the tilt coil 43. Then, the tilt coil 43 is forced downwardly in the area corresponding to the first magnet section M1 and forced upwardly in the area corresponding to the second magnet section M2. Therefore, the bobbin 20 is tilted in the T2 direction by the tilt coil, concurrently with being moved downwardly by the focusing coils 41, 42.

Accordingly, it is possible to control the driving of the first and second objective lenses 31, 33 mounted on the bobbin 20 in the tilt direction, by applying electric currents to the respective focusing coils 41, 42 in the opposite directions and by controlling the amount of electric currents flowing in any one direction in the tilt coil 43. Likewise, it is possible to tilt the bobbin 20 by applying electric currents only to the tilt coil without applying electric currents to the focusing coils 41, 42.

Below, the driven movement of the bobbin 20 in the track direction by the cooperation between the respective track coils 44, 45 and the respective polarization magnets 61, 63 is described.

Figure 7A:
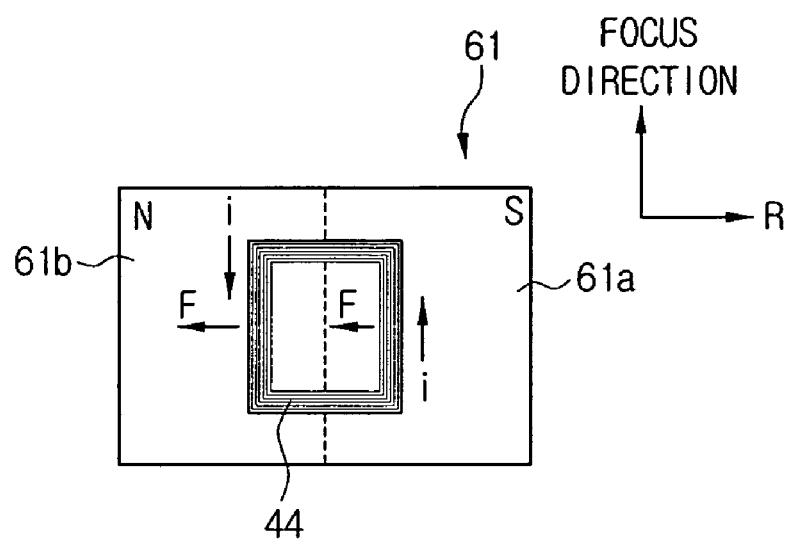
FIGS. 7A and 7B illustrate an operation for driving the bobbin in a track direction according to an exemplary embodiment of the present invention.

As shown in FIG. 7A, the polarization magnet 61 is bipolarized into N-pole and S-pole. In this state, the track coil 44 has longer sides in the vertical direction, and the longer sides are arranged to confront the first part 61a of N-pole and the second part 61b of S-pole, respectively. In this state, assuming that the magnetic field coming out from the first part 61a projects in the direction vertical to the surface of the drawing, the parts confronting the pair of the longer sides of the track coil will be the effective track coil parts which can take part in generation of a magnetic force as electric currents flow in the longer sides in the opposite directions as shown in the drawing. If electric currents are applied counterclockwise to the track coil in this manner, the longer sides are forced in the left direction.

Figure 7B:
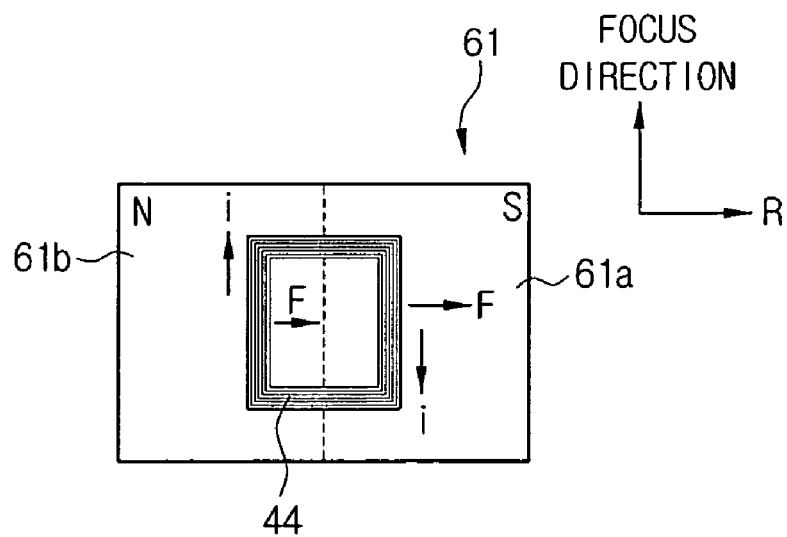

In addition, as shown in FIG. 7B, if electric currents flow clockwise in the track coil 44, the longer sides of the track coil 44 are forced in the right direction. Like this, depending on the polarity and amount of the electric currents applied to the track coil 44, it is possible to drivingly control the first and second objective lenses 31, 33 mounted on the bobbin 20 in the track direction (R direction).

Since the forces to be acted on the track coil 45 by the cooperation between the track coil 45 and the second polarization magnet 63, which confront each other, can be sufficiently appreciated from the description made above with reference to FIGS. 7a and 7b, detailed description is omitted.

That is, the other track coil 45 can be controlled in position in the track direction of the bobbin 20 by controlling the polarity and amount of electric currents applied to the track coil 45.

As described above, in an actuator according to an exemplary implementation of the present invention, focusing coils 41, 42 and a tilt coil 43 for controlling a bobbin 20 in the focus and tilt directions are independently installed so that they are capable of being independently driven.

As a result, it is possible to improve the adaptive performance of an optical pickup for making objective lenses to be adapted to a system as well as the sensitivity of the optical pickup.

In addition, by installing the focusing coils and the tilt coil to be in close contact with the inner sides of the bobbin, it is possible to reinforce the strength of an injection-molded bobbin. Accordingly, it is possible to sufficiently secure the movement and increase sensitivity in a high-speed rotation.

Figure 8:
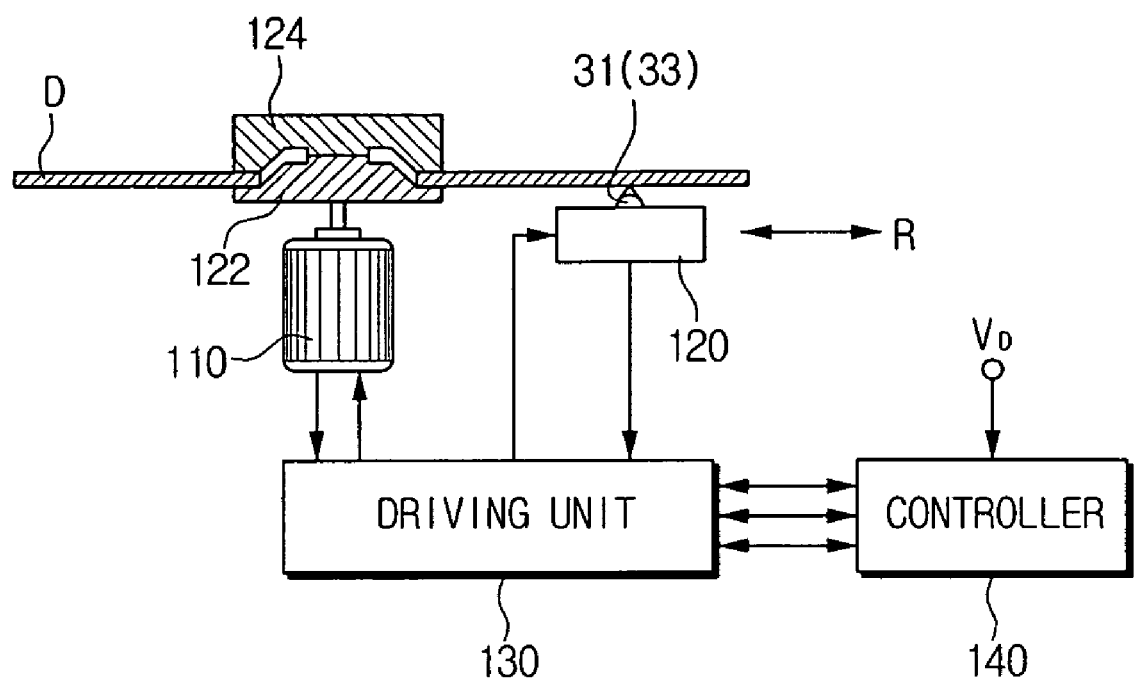
FIG. 8 is a schematic diagram showing an optical recording/reproducing apparatus according to an exemplary embodiment of the present invention.

FIG. 8 schematically shows an optical recording/reproducing apparatus employing the inventive optical pickup actuator.

Referring to FIG. 8, the optical recording/producing apparatus comprises a spindle motor 110 for rotating an optical information storage medium, e.g., an optical disc D, an optical pickup 120 installed to be movable in the radial direction R of the optical disc D to reproduce information from/record information into the optical disc D, a driving unit 130 for driving the spindle motor 110 and the optical pickup 120, and a controller 140 for controlling the focusing, tracking and tilt servos of the optical pickup 120. Here, reference numeral 122 indicates a turntable, and reference numeral 124 indicates a clamp for chucking an optical disc D.

The optical pickup 120 comprises an optical system having objective lenses 31, 33 for focusing light projected from a light source into the optical disc, and an optical pickup actuator for three-axis driving of the objective lenses. At this time, the optical pickup actuator described above with reference to FIGS. 1 to 7b can be employed as the optical pickup actuator.

The light reflected from the optical disc D is detected by an optical detector provided in the optical pickup 120 and photoelectrically converted into an electric signal. The electric signal is inputted into the controller 140 through the driving unit 130. The driving unit 130 controls the rotational speed of the spindle motor 110, amplifies the inputted signal and drives the optical pickup 120.

The controller 140 sends a command concerning the focusing, tracking and tilt servos controlled on the basis of the signal inputted from the driving unit 130 to implement the focusing, tracking and tilt movement of the optical pickup 120.

Although it has been described that two objective lenses are mounted on one bobbin 20, this is merely an example. That is, although there are provided two lens mounting holes 21, 23 in the bobbin 20, only one lens mounting hole may have one objective lens to be used. In this event, the one objective lens can be easily adjusted using the above-mentioned magnetic circuit.

Furthermore, it is also possible to provide a bobbin 20 with a construction for mounting more than two objective lenses, so that the bobbin 20 can be applied to an optical pickup capable of compatibly recording/reducing two, three or more types of optical discs which are different in record density, for example, a CD, a DVD and a HD-DVD.

As described above, an inventive optical pickup actuator according to an exemplary implementation of the present invention comprises a single bobbin mounted with two objective lenses, so that the objective lenses can be independently and simultaneously controlled in the focus, tilt and track directions.

Accordingly, the sensitivity and adaptive performance at a high speed can be improved.

In addition, it is possible to reinforce a bobbin formed through injection molding by installing focusing coils and a tilt coil, which are independently driven, to be in close contact with the inner walls of the bobbin.

Consequently, it is possible to sufficiently secure a movement of a secondary resonance frequency to a higher area and a gain margin, wherein the secondary resonance frequency is produced by a physical characteristic of a bobbin.

An optical pickup actuator according to an exemplary implementation of the present invention can be adaptively employed to a high speed optical recording/reproducing apparatus.

Several exemplary embodiments of the present invention have been shown and described in order to exemplify the principles of the present invention, but the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. An optical pickup actuator comprising:
    a bobbin comprising at least one objective lens mounted thereon for allowing light to be incident onto an optical information storage medium;
    a movable support member for supporting the bobbin; and
    a magnetic circuit for driving the bobbin independently in focusing and tilt directions;
    wherein the bobbin comprises plural lens mounting holes arranged in the track direction of the optical information storage medium, whereby the bobbin is arranged to accommodate plural objective lenses;
    wherein the magnetic circuit comprises:
    a pair of focusing coils adjacent to each other in the bobbin;
    a tilt coil comprising working sides corresponding to working sides of the focusing coils, respectively; and
    at least one magnet section for generating a driving force in the focusing direction by cooperating with the focusing coils, and a driving force in the tilt direction by cooperating with the tilt coil.

2. An optical pickup actuator as claimed in claim 1, wherein the magnet sections comprise:
    a first magnet section, in which the bobbin is interposed; and
    a second magnet section arranged adjacent to the first magnet section, wherein the second magnet section is opposite in polarity to the first magnet section diametrically across the bobbin.

3. An optical pickup actuator as claimed in claim 2, wherein each of the first and second magnet sections comprises a pair of polarization magnets arranged to confront each other with the bobbin being interposed between the pair of polarization magnets, wherein the polarization magnets are depolarized in the direction parallel to the working sides of the focusing coils.

4. An optical pickup actuator as claimed in claim 1, wherein the pair of focusing coils are arranged parallel to the track direction, wherein the track direction crosses the focusing direction.

5. An optical pickup actuator as claimed in claim 1, wherein the focusing coils and the tilt coil are arranged to be overlapped with each other in the focusing direction.

6. An optical pickup actuator as claimed in claim 1, wherein the focusing coils are positioned higher than the tilt coil in reference to the focusing direction.

7. An optical pickup actuator as claimed in claim 1, wherein the focusing coils comprise a larger thickness than the tilt coil in the focusing direction.

8. An optical pickup actuator as claimed in claim 1, wherein the magnetic circuit further comprises:
    at least one internal yoke inside of the focusing coils and the tilt coil; and
    at least one external yoke outside of the focusing coils and tilt coil.

9. An optical pickup actuator as claimed in claim 8, further comprising a base, wherein the at least one external yoke is provided on the base to support the magnet sections.

10. An optical pickup actuator as claimed in claim 8, wherein the at least one internal yoke comprises:
    a pair of first internal yokes arranged to confront the sides of the focusing coils and the tilt coil, the sides being parallel to the track direction of the optical information storage medium; and
    a pair of second internal yokes adjacent to the first internal yokes in the track direction and arranged to confront the working sides of the focusing coils and the tilt coil.

11. An optical pickup actuator comprising:
    a bobbin comprising at least one objective lens mounted thereon for allowing light to be incident onto an optical information storage medium;
    a movable support member for supporting the bobbin; and
    a magnetic circuit for driving the bobbin independently in focusing and tilt directions;
    wherein the bobbin comprises plural lens mounting holes arranged in the track direction of the optical information storage medium, whereby the bobbin is arranged to accommodate plural objective lenses:
    wherein the bobbin comprises a pair of lens mounting holes, and wherein the magnetic circuit comprises:
    a pair of focusing coils wound about the lens mounting holes, respectively;
    a tilt coil wound to surround the pair of lens mounting holes; and
    at least one magnet section for generating at least one of a driving force in the focusing direction by cooperating with the focusing coils, and a driving force in the tilt direction by cooperating with the tilt coil.

12. An optical pickup actuator as claimed in claim 11, wherein the bobbin comprises a coil mounting area communicating with the lens mounting holes, and wherein the coil mounting area receives the focusing coils and the tilt coil adjacent to each other in the track direction.

13. An optical pickup actuator as claimed in claim 12, wherein the focusing coils and the tilt coil are arranged adjacent to each other in the focusing direction.

14. An optical pickup actuator as claimed in claim 1, wherein the bobbin comprises a coil mounting area for supporting the focusing coils and the tilt coil on the inner walls thereof.

15. An optical pickup actuator as claimed in claim 14, wherein the coil mounting area comprises a partition interposed between the focusing coils to isolate them.

16. An optical pickup actuator as claimed in claim 1, wherein the magnetic circuit further comprises a pair of track coils for driving the bobbin in the track direction of the optical information storage medium by cooperating with the magnet sections.

17. An optical pickup actuator as claimed in claim 16, wherein the track coils are supported on the external surfaces of the bobbin respectively confronting the magnet sections, the track coils being installed between the focusing coils in the track direction.

18. An optical pickup actuator as claimed in claim 17, wherein the track coils are arranged so that sides parallel to the focusing direction among sides confronting the magnet sections facilitate generation of an electromagnetic force in the track direction.

19. An optical pickup actuator comprising:
   a bobbin configured to accommodate a plurality of objective lenses for at least one of recording information into optical information record media which are different from each other in record density and reproducing information from the optical information record media;
   a support member for movably supporting the bobbin; and
   a magnetic circuit for driving the bobbin independently in a focus direction and in a tilt direction;
   wherein the magnetic circuit comprises:
   a plurality of focusing coils supported in the bobbin and correspond to the plurality of the objective lenses, respectively;
   at least one tilt coil installed in the bobbin to correspond and corresponding to the plurality of the objective lenses; and
   a pair of polarization magnets arranged to confront each other with the bobbin being interposed between the polarization magnets;
   wherein the polarization magnets are bipolarized in the track direction of the optical information record mediums.

20. An optical pickup actuator as claimed in claim 19, wherein the focus coils and the tilt coil are overlapped with each other in the focusing direction.

21. An optical pickup actuator as claimed in claim 19, wherein the polarization magnets are arranged to be opposite, in the direction of magnetic fluxes, to each other, with the focusing coils being interposed between the polarization magnets.

22. An optical pickup actuator as claimed in claim 19, wherein the magnetic circuit further comprises:
   a pair of track coils mounted on the surfaces of the bobbin confronting the polarization magnets to drive the bobbin in the track direction.

23. An optical pickup actuator as claimed in claim 22, wherein the track coils are positioned at the central position between the focusing coils in the focusing direction.

24. An optical pickup actuator as claimed in claim 19, further comprising a base, wherein the magnetic circuit comprises:
   external yokes provided on the base to support the polarization magnets; and
   plural internal yokes provided on the base and positioned within the focusing coils.

25. An optical recording/reproducing apparatus comprising:
   an optical pickup comprising an actuator for driving an objective lens and installed to be movable in the radial direction of an optical information storage medium for at least one of recording information into the optical information storage medium and reproducing information from the optical information storage medium; and
   a controller for controlling focusing, track and tilt servos;
   wherein the actuator comprises:
   a bobbin comprising at least one objective lens mounted thereon for allowing light to be incident onto the optical information storage medium, the bobbin being movably supported by a support member; and
   a magnetic circuit for driving the bobbin independently in focusing and tilt directions, the magnetic circuit comprising:
   a pair of focusing coils installed in the bobbin to be adjacent to each other;
   at least one tilt coil arranged adjacent to the focusing coils; and
   a pair of polarization magnets arranged to confront each other with the bobbin being interposed between the polarization magnets, wherein the polarization magnets are bipolarized in the direction parallel to the focusing coils oriented direction.

26. An optical recording/reproducing apparatus as claimed in claim 25, wherein polarization magnets are arranged to be opposite in polarity to each other diametrically across the bobbin interposed between the polarization magnets.

27. An optical recording/reproducing apparatus as claimed in claim 25, wherein the magnetic circuit further comprises:
   a pair of track coils supported on the bobbin to face to the polarization magnets, respectively, to drive the bobbin in the track direction.

28. An optical recording/reproducing apparatus as claimed in claim 25, wherein the bobbin comprises lens mounting holes for supporting the objective lenses, wherein the lens mounting holes are positioned to respectively correspond to the focusing coils in the focusing direction.

29. An optical recording/reproducing apparatus as claimed in claim 25, wherein the focusing coils are wound to have a larger thickness than the tilt coil in the focusing direction.

* * * * *

UNITED STATES PATENT AND TRADEMARK OFFICE
CERTIFICATE OF CORRECTION

PATENT NO. : 7,668,049 B2  Page 1 of 1
APPLICATION NO. : 11/311350
DATED : February 23, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-eighth Day of December, 2010

David J. Kappos
*Director of the United States Patent and Trademark Office*